United States Patent
Prieto Barranco et al.

(10) Patent No.: US 8,740,181 B2
(45) Date of Patent: Jun. 3, 2014

(54) SERVO-POSITIONER FOR A MICRO-REGULATING VALVE

(75) Inventors: Jose Prieto Barranco, Madrid (ES); Consuelo Goberna Selma, Madrid (ES)

(73) Assignee: Consejo Superior de Investigaciones Cientificas, Madrid (ES)

( * ) Notice: Subject to any disclaimer, the term of this patent is extended or adjusted under 35 U.S.C. 154(b) by 1398 days.

(21) Appl. No.: 11/628,339

(22) PCT Filed: Jun. 2, 2005

(86) PCT No.: PCT/ES2005/070080
§ 371 (c)(1), (2), (4) Date: May 17, 2007

(87) PCT Pub. No.: WO2006/021603
PCT Pub. Date: Mar. 2, 2006

(65) Prior Publication Data
US 2007/0241296 A1    Oct. 18, 2007

(30) Foreign Application Priority Data
Jun. 3, 2004   (ES) .................................. 200401348

(51) Int. Cl.
*F16K 31/02*   (2006.01)
(52) U.S. Cl.
USPC ....... 251/129.04; 137/554; 318/664; 318/652
(58) Field of Classification Search
USPC .............. 137/554; 251/129.04; 318/644, 652
See application file for complete search history.

(56) References Cited

U.S. PATENT DOCUMENTS

| | | | | |
|---|---|---|---|---|
| 4,529,900 A * | 7/1985 | Uzuka | | 310/43 |
| 5,137,257 A * | 8/1992 | Tice | | 251/129.11 |
| 5,291,919 A * | 3/1994 | Calzavara | | 251/129.04 |
| 5,327,064 A * | 7/1994 | Arakawa et al. | | 318/801 |
| 5,487,302 A * | 1/1996 | Casada et al. | | 73/168 |
| 5,912,541 A * | 6/1999 | Bigler et al. | | 318/600 |
| 5,913,330 A * | 6/1999 | Jones et al. | | 137/493.8 |
| 6,003,535 A * | 12/1999 | Ollivier | | 251/129.11 |
| 2002/0109115 A1 | 8/2002 | Cederstav et al. | | |

FOREIGN PATENT DOCUMENTS

| | | |
|---|---|---|
| EP | 1477873 | 11/2004 |
| GB | 2340915 | 1/2000 |
| WO | 03/042586 | 5/2003 |

* cited by examiner

*Primary Examiner* — John K Fristoe, Jr.
*Assistant Examiner* — Andrew J Rost
(74) *Attorney, Agent, or Firm* — Wenderoth, Lind & Ponack, L.L.P.

(57) ABSTRACT

The invention relates to a positioning system which is suitable for micrometric regulating valves. The invention comprises a micro-regulating valve which is connected to the shaft of a servomotor by a flexible coupler and which is fixed to the same using a support. The aforementioned motor is, in turn, coupled to a potentiometer which transmits the position of the shaft of the motor and, consequently, of the rod of the valve to a control system which compares a signal received from an external control system with the position of the value, the position of the valve being corrected with a movement of the motor. In this way, a quick and precise positioning system can operate at high pressures and with very low flow rates.

14 Claims, 1 Drawing Sheet

SERVO-POSITIONER FOR A MICRO-REGULATING VALVE

BACKGROUND OF THE INVENTION

I. Field of the Invention

The invention relates to a servo-positioner for a micro-regulating valve especially applicable in flow or pressure-control systems which work at high pressure and/or low flow rates, specifically being a micro-regulating valve, with or without modified seat, actuated by means of a very high-resolution, high-speed servomotor system.

The object of the invention is to provide a quick, precise positioning system for micrometric regulating valves, with an instantaneous response speed for the application thereof in pressure and/or flow rate control systems for micro-pilot or laboratory-scale reactors or equipment.

II. Description of Related Art

Most pilot systems, particularly a reactor for laboratory-scale studies, entail the use of extremely low flow rates and customarily high pressures. This involves working with valves which have considerably low Cv values, e.g., on the order of $10^{-7}$ to $10^{-4}$. The mechanical building of these valves entails bordering on the precision limits of the machines and tools necessary for building the same. So much so that the manufacturers find themselves forced to resolve the machining of these systems with simple solutions, such as, for example, inserting a cylinder inside a likewise cylindrical hole such that the modulation of the fluid flowing through is not a consequence of the variation in the cross-section of the opening through which it flows, but rather is a function of the length through which it travels in a constantly narrowing cross-section, modulated by the length of the shutter which is inserted inside the seat.

This entails a highly major restriction in the use of these valves, which mainly consists of their very low scalability (difference between the flow rate circulating for a certain pressure differential when the latter is completely closed or completely open), normally on the order of 10-15. This term is normally known as rangeability.

This entails a highly major limitation for these systems, which can be understood by way of the following overly-simplified example: A valve with $Cv_{hypothetical}=40$ has been selected for a system such that the mean working range thereof is P=5 bar, Q=100 cm$^3$/min, such that $Cv_{hypothetical}$ within this range is 100/5=20. Given that the scalability of this valve will be, due to mechanical building limitations, near 10, the working $Cv_{hypothetical}$ will take on values ranging from 4 up to 40. If the pressure is kept constant at 5 bar and the aim is to study the performance of this process for different flow rates, these flow rates may vary between 200 and 20 cm$^3$/min (a proportion of 10 obviously exists between these values). The problem arises when intending to study the performance of the system for different pressures, due to the fact that, if intended to work at 20 bar with the 20 cm$^3$/min flow rate, a $Cv_{hypothetical}$ of 1 would be necessary, and besides, if it is decided to study the system when the pressure is at 1 bar, in order for the 200 cm$^3$/min to flow through the valve, it would be necessary to have a flow-through capacity or $Cv_{hypothetical}$ of 200.

In this example, that so as to not limit the studying capacity of this process in the prepared system, the "rangeability" of the control valve should have been 200, twenty times greater than the "rangeability" of the micro-flow valves currently on the market.

In the micro-flow systems, controlling the pressure entails a significant problem. In fact, in a catalytic microactivity reactor, the situation which comes to bear when the flow of gases in the system is quite low, on the order of 20 or 50 Ncm$^3$/min and the pressure is high, on the order of 90 bar, is a problem difficult to remedy. The most common alternatives for controlling the pressure in these systems total three in number: the use of a mechanical pressure controller upstream (back-pressure) in an opening-diaphragm-spring mechanism; that of an electronic back-pressure with an MFC valve; and lastly, the pressure in the system can be controlled by closing a control loop, where the end element is a control valve, normally of the pneumatic type, with an electropositioner.

In the mechanical controller, the pressure in the system is transmitted through an opening into the outlet chamber, but this opening is sealed with a diaphragm on which the spring exerts pressure. When the pressure in the system overcomes the pressure exerted on the opening by the spring, the diaphragm opens and the forces then reach equilibrium. The pressure at which this occurs is selected by calibrating the valve or, likewise, by actuating a control which compresses the spring against the diaphragm to select higher or lower triggering pressures.

A device of this type entails a great number of drawbacks: the mechanical control device is of the "only" proportional type, and therefore is affected by an offset error, in other words, once a working pressure has been selected, if the flow rate increases, the pressure value shifts.

In addition to above, although the manufacturers have a vast range of equipment, they do not have instruments suitable for the flow rates within which this type of micro-flow systems work. Hence, when using instruments not suitably dimensioned, the pressure in the system moves the membrane and the fluid flows through the opening, the Cv defining the same is so high that a high majority of the fluid leaks out, the pressure drops and the spring again overcomes the pressure in the system, closing the diaphragm. This operation is repeated when the system once again reaches a pressure high enough to move the diaphragm, the situation in which the diaphragm is in equilibrium at a certain distance from the opening never been achieved. An appropriate data acquisition system could detect a slight oscillation in the system pressure of, for example, ±0.1 bar in 90 bar, which could lead one to think that the control system is quite precise. The situation, to the contrary, is not acceptable for a reaction system, given that the flow circulating through the reactor is pulsating, and the results obtained therefrom are very likely going to be influenced by this characteristic.

Furthermore, these apparatuses are characterized by having a very high dead volume in comparison to the reaction system. If vapors are circulating through the system, they will condense on the inside thereof and will not be evacuated, given the disproportion in the size (the dead volume can be on the order of no less than 25 cm$^3$). Solutions such as that of heating the instruments do not provide satisfactory results in most cases.

The "manual" functioning feature of these systems, which cannot be managed by remote control systems or entail disproportionate costs in doing so, must also not be overlooked.

The electronic back-pressure system with an MFC valve is stable in controlling the pressure, and the field of operativity is relatively acceptable; on the contrary, the main problems arise when there are vapor-phase products in the system. Logically, the proper performance of these instruments is a result of how well their Cv is adjusted to the type of process. This valve flow coefficient is determined by the size of the control valve opening. In a situation in which the vapors present build up to the point of forming a microdroplet of condensate, at the point in time when this microdroplet moves through the opening, the pressure inside the system will rise instantaneously due to the blockage caused by the liquid passing through this micro-opening.

It must also be taken into account that, in these systems, the non-condensates are of widely differing types and that, in terms of the type in question, many of these products can be considered "fouling" in the regard that they can build up on the walls inside the instrument, permanently blocking the control valve opening. In fact, experience goes to show that these instruments are exceedingly delicate for the work in a very high percentage of reaction systems.

Also advantageous to note is that these systems cannot be heated due to their being of the electronic type and due to the valve consisting mainly of an electrically-operated solenoid coil valve.

As an alternative to the above-mentioned systems, the problem of control in these systems can be remedied by configuring a conventional pressure control loop, in which the signal from a pressure transmitter is received by a PID controller which processes the control signal and transmits it to a control valve which acts on the outlet current of the system by modulating the circulating flow and thus controlling the pressure. But, in addition to other problems they may have, the conventional commercial micro-valves are characterized by a low "rangeability" when the required Cv is below the barrier of approximately $10^{-3}$. In fact, there are very few manufacturers who supply valves with such low valve flow coefficients.

In the micro-flow valves, which entail Cv values of $10^{-4}$ to $10^{-6}$, for example, this problem is increased to the limit. Mainly, the low useful working scale of these valves is a result of the problems involved in machining the openings and shutters to the sizes required for generating these low valve flow coefficients. These machining problems lead builders to opt for machining a cylindrical opening and inserting a likewise cylindrical rod through the opening with a certain tolerance between these two elements. Then, the rod runs from its minimum position to maximum run to vary not the cross-section of the narrowest area, but rather the length thereof through which the fluid must pass on flowing through the valve, keeping the flow cross-section constant.

SUMMARY OF THE INVENTION

The servo-positioner for the micro-regulating valve proposed by the present invention provides a satisfactory solution to the problems set out hereinabove in the different aspects discussed, given that it is a system for positioning a micrometric regulating-vale which makes it possible to achieve a high rangeability for the process conditions.

The system the invention proposes includes a commercial micro-regulating valve, connected by means of a flexible coupler to a servomotor, which is connected, in turn, to potentiometers or to an encoder in order to know the position of the valve at all times. There is no demultiplication between the valve rod and the position-measuring element.

The micro-regulating valve includes a needle which progressively further adjusts an opening as the needle shifts position, generating a flow-through varying in cross-section in terms of the proportion in which the needle has shifted position; this type of valve therefore improving, in addition to the rangeability, the precision of the control, given that the change in position cannot take place linearly, but rather is moved by means of the turning action of the rod by means of a micrometric screw, in addition to the internal dead weight for these valves being very low, of less than 0.5 cm$^3$.

Another advantage of this type of valve is that they can be heated up to a temperature of approximately 200-250° C. if the packing is Teflon, and due to their minimal dimensions, can be inserted inside a hotbox containing all of the heated-insulated lines in the system. Nor does the appearing of microdroplets of condensate pose any problem, given that, in these valves, the size of the opening is modulated, as a result of which, as soon as this opening reaches the appropriate dimensions, the droplet will pass through it without causing any accident in the operation.

The control valve must be built using the appropriate materials, preferably stainless steel, and must also withstand high working temperatures, and even more importantly, the packing thereof must be chemically compatible with the substances with which it is going to work.

One of the important features of the proposed device consists of using a support for this micro-regulating valve, which will be connected to the motor shaft by means of a flexible coupler, allowing the forward and backward movement of the rod during the opening and closing runs and also making it possible to connect a high-resolution encoder or potentiometer to the opposite end of the motor shaft which will copy and transmit the position of the motor shaft, and therefore of the valve rod, to the control system.

The potentiometer is the device in charge of reading the exact position at which the valve rod is located and therefore of transmitting the exact position of the shutter in regard to the valve opening. The potentiometer is located on the motor shaft, at the end opposite the valve, secured by means of an accessory which has been prepared for this purpose. This is a variable electrical coil, between the two ends of which a reference voltage is applied, having a pointer which is moved by this fixed resistance and, as this occurs, the voltage drop between the ends of the coil varies. Therefore, by measuring the voltage drop between the pointer and one end, the relative position of this pointer in relation to the end will be known.

The servomotor used is a step-by-step working on a very simple operating principle. This is based on electromagnets which alternately connect and disconnect so that a rotor, which is usually a permanent magnet, moves in small steps in the required direction, so that by alternating the energizing scheme for the motor coils, it is thus possible for this rotor to move step-by-step.

This servomotor of, for example, 200 steps per full turn, is controlled by means of multistep electronics, even 51,200 steps per turn being achieved, thus making a high-precision positioning of the motor shaft possible.

The digital design of this positioning system makes its electronics very simple, which includes a microprocessor which runs the position control program and which transmits the movement commands to a motor coil power and control circuit.

The position control system includes a comparator between the control signal received from an external control system and the position of the valve read by the potentiometer, then calculating the number of positions it must move forward, all within an infinite loop which at all times corrects the position of the motor. All of which is high-speed as a result of its being a digital control system.

In this system, the monitoring potentiometer is read by the circuit at its start-up for the system reset and is read afterward each time a positioning cycle is completed for the purpose of checking to ensure the proper working order of the system. This is an open-loop system. A current generator is sued for reading the potentiometers, and an instrumentation amplifier, eliminating errors and noise from the wiring.

The servo-positioning system with step-by-step motor described hereinabove, makes it possible to achieve precisions of better than ±1°, meaning very good performance for the high-pressure and/or low flow rate systems discussed.

DESCRIPTION OF THE DRAWINGS

To complete the description being provided herein and for the purpose of aiding toward a better understanding of the features of the invention, according to a preferred practical embodiment thereof, attached hereto please find, as an integral part of said description, a set of drawings in which the following has been shown for illustrative yet non-limiting purposes.

DETAILED DESCRIPTION OF THE INVENTION

Figure 1:
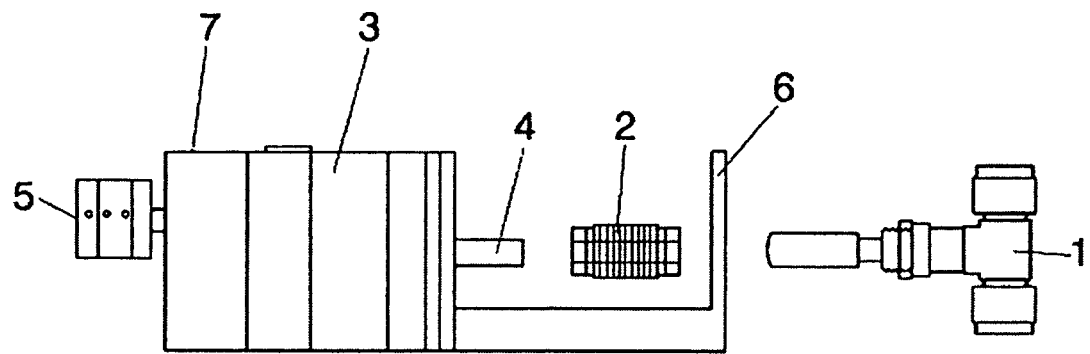
FIG. 1. is a schematic diagram showing all of the elements comprising the servo-positioner for micro-regulating valves comprising the object of the invention.

In view of the figures stated hereinabove, more specifically FIG. 1, it is shown how the servo-positioner comprising the object of the invention is essentially comprised of a micro-regulating valve (1), connected by means of a flexible coupler (2) to a servomotor (3) with shafts (4) at both ends, which, in turn, is connected to a potentiometer (5), which makes it possible to know the position of the valve (1) at all times.

These elements comprising the system are mounted such that they form an assembly for which they have a support (6) for the micro-regulating valve (1), which will be connected to the shaft (4) of the motor (3) by means of the flexible coupler (2), making the forward and backward movement of the rod possible during the closing and opening runs.

The valve (1) employed meets the characteristics specified for the application for which it is intended, in other words, it can be used for pressures of up to 200 bar at a temperature of 205° C., has a packing which allows the leak-free closing of the rod without any major compression thereof, is smooth-running, all of the internal elements thereof being made of stainless steel and Teflon, and also having a modified opening made of polyetheretherketone, a chemically inert material with good mechanical features which withstands high working temperatures and has self-lubricating properties, providing the valve (1) with greater sturdiness and resistance to deformation over the course of time, hence preventing the needle from wear.

As a servomotor (3), a step-by-step motor of 200 steps per turn in configuration with 50,000 steps per rotation has been selected.

The potentiometer (5) is the device in charge of reading the exact position in which the rod of the valve (1) is located and therefore, of transmitting the exact position of the shutter in relation to the opening of said valve (1). This potentiometer is located on the shaft (4) of the motor (3), at the end opposite to the valve (1), secured by means of a coupler accessory or support (7).

In the example of the invention being described, the potentiometer (5) used is a high-resolution multi-turn potentiometer, which includes a spiral winding inside another which raises and lowers as it turns, this potentiometer (5) specifically being of 10 turns or 3600°, with a 1° resolution. As previously mentioned hereinabove, it copies and retransmits the position of the shaft (4) of the motor (3) and therefore of the rod of the valve (1), to a control system. The position of the shaft of the motor (3) is transmitted to the potentiometer (5) by means of a gear-based transmission system, without demultiplication.

Figure 2:
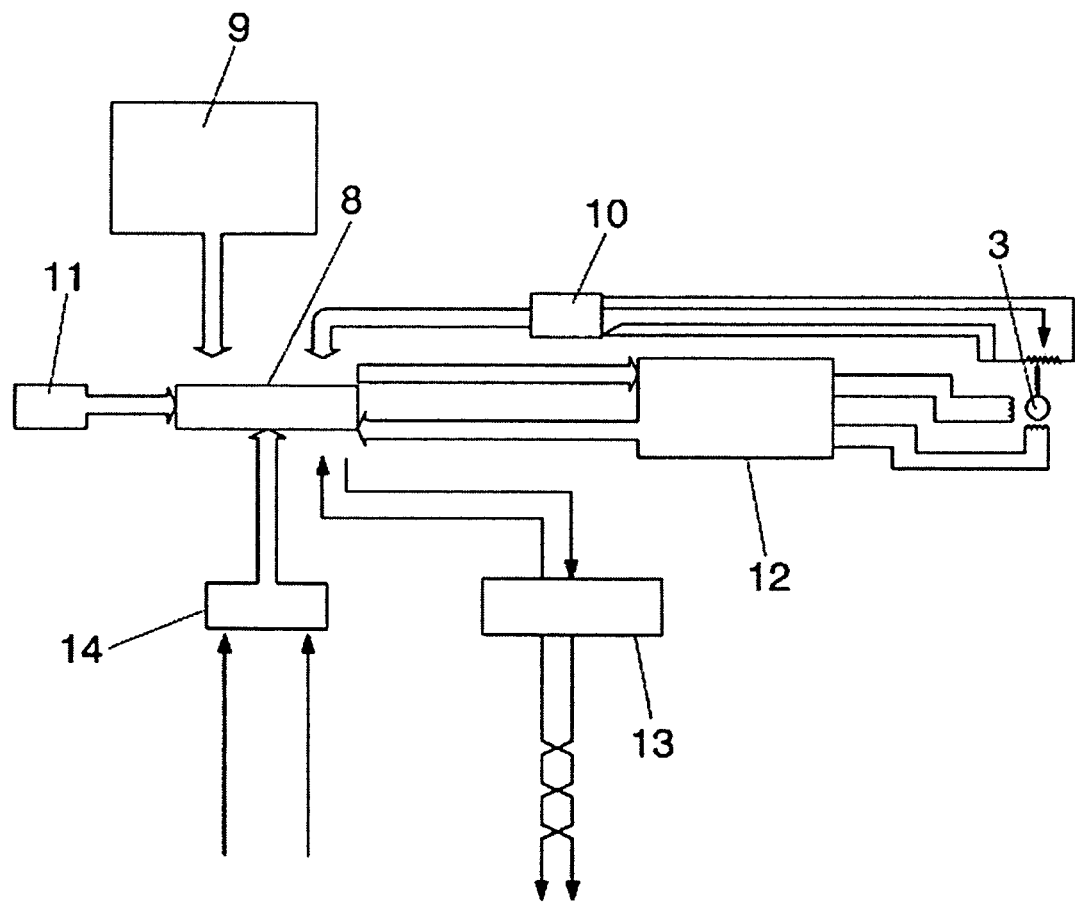
FIG. 2. is a block diagram showing the system which controls the servo-positioner proposed by the invention.

All of these mechanical elements described hereinabove are controlled by means of a control circuit, shown in FIG. 2, which is comprised of a microprocessor (8) which runs a position control program and which transmits the movement commands to a power and control circuit of the coils of the motor (3).

The microprocessor (8) receives the configuration of the system by means of a set of configurable switches (9). The position control signal (11), converted into a digital signal, is one of the system inputs, which is compared to the signal (10) received from the monitoring potentiometer (5) to run the position correction algorithm. The output signal of this algorithm is digitally transmitted to the micro-step controller (12) of the motor (3) to correct the position. The system can also be controlled and/or configured externally by a digital signal (13), by making use of digital communications with the microprocessor or microcontroller (8). The control circuit also has auxiliary analog inputs which may be used for recopying the position or for other similar purposes.

The electronic controller (12) makes the positioning of the valve (1) possible, positioning, in turn, the shaft (4) of the motor (3), with precisions exceeding 1°.

According to that which is set out hereinabove, the resulting unit makes it possible to control the system with precisions never before achieved, instantaneous response speed, ample rangeabilities and force sufficient to position the valve (1) in relation to the pressure exerted by systems which work at very high pressures, which makes this an optimum system for working in pilot systems for supercritical conditions at a pressure of 400 bar.

This type of servo-positioned control valves have also be applied in microactivity reactors, the system performance having been found to be excellent at practical experience for a supply of 50 Ncm$^3$/min of H$_2$ and a pressure of 50 bar, the operation having been concluded with a precision of 50.0±0.1 bar, which is precisely the precision of the measuring element. And this has been so even when the system, in terms of its commissioning, has undergone some major changes, such as the stabilization of the temperatures in the hotbox and in the reactor, the star-up of the fluid pump and the starting of the delivery of fluids from the reactor. The precision in the valve response in relation to the signal received from the controller takes place without any delay in transport, making the high precision found in the control possible.

The invention claimed is:

1. A servo-positioner for a micro-regulating valve, said servo-positioner comprising:
    a digital control system configured to operate at high pressure rates and at high pressure and micro flow rates;
    a servomotor having a shaft, said shaft having a first end and a second end opposite said first end;
    a micrometric valve having a rod and a needle, and being connected to said first end of said shaft of said servomotor;
    a coupling part; and
    a potentiometer coupled to said servomotor at said second end of said shaft by said coupling part, so as to know, at any time, the position of said micrometric valve, wherein said potentiometer continuously measures and retransmits the position of said shaft of said servomotor, and therefore, the distance between the rod and an opening of the micrometric valve, to said digital control system, said opening being made of polyetheretherketone, wherein said needle of said micrometric valve progressively adjusts the opening as said needle shifts position, generating a flow-through varying in cross-section based on the proportion in which said needle has shifted position, said needle being moved by a turning action of said rod by a micrometric screw, a support secures said micrometric valve to said servomotor, a flexible coupler connects said micrometric valve to said shaft of the servomotor, thus enabling forward and backward movement of said rod of said micrometric valve, and wherein said digital control system comprises a comparator which recursively and automatically compares a control signal received from an external control system and the position of the rod of the micrometric valve read by the potentiometer calculating a number of steps that the servomotor has to move the rod for adjusting the position of the micrometric valve.

2. A servo-positioner according to claim 1, wherein said control system includes a microprocessor which, by comparing the signal said control system receives from said potentiometer to a position control signal, and by transmitting an output signal to a microstep controller, thus correcting the position of said servomotor and therefore of said micrometric valve, demultiplication between said valve rod and said potentiometer is eliminated.

3. A servo-positioner according to claim 1, wherein said micrometric valve is configured to operate at a maximum pressure of 400 bars.

4. A servo-positioner according to claim 3, wherein said micrometric valve is configured to control the pressure within plus or minus 0.1 bar.

5. A servo-positioner according to claim 1, wherein said micrometric valve is configured to operate at a maximum temperature of 250° C.

6. A servo-positioner according to claim 1, wherein said servomotor is a step motor.

7. A servo-positioner according to claim 1, wherein said opening made of polyetheretherketone is configured and arranged such that a dead volume for said micrometric valve is less than 0.5 cm$^3$.

8. A servo-positioner for a micro-regulating valve, said servo-positioner comprising:
 a digital control system configured to operate at high pressure rates and at high pressure and micro flow rates;
 a servomotor having a shaft, said shaft having a first end and a second end opposite said first end;
 a micrometric valve having a rod and a needle, and being connected to said first end of said shaft of said servomotor;
 a coupling part; and
 a high resolution encoder coupled to said servomotor at said second end of said shaft by said coupling part, so as to know, at any time, the position of said micrometric valve, wherein said high resolution encoder continuously measures and retransmits the position of said shaft of said servomotor, and therefore, the distance between the rod and an opening of the micrometric valve to said digital control system, said opening being made of polyetheretherketone, wherein said needle of said micrometric valve progressively adjusts an opening as said needle shifts position, generating a flow-through varying in cross-section based on the proportion in which said needle has shifted position, said needle being moved by a turning action of said rod by a micrometric screw, a support secures said micrometric valve to said servomotor, a flexible coupler connects said micrometric valve to said shaft of the servomotor, thus enabling forward and backward movement of said rod of said micrometric valve, and wherein said control system comprises a comparator which recursively and automatically compares a control signal received from an external control system and the position of the rod of the micrometric valve read by the high resolution encoder calculating a number of steps that the servomotor has to move the rod for adjusting the position of the micrometric valve.

9. A servo-positioner according to claim 8, wherein said control system includes a microprocessor which, by comparing the signal said control system receives from said high resolution encoder to a position control signal, and by transmitting an output signal to a microstep controller, thus correcting the position of said servomotor and therefore of said micrometric valve, demultiplication between said valve rod and said high resolution encoder is eliminated.

10. A servo-positioner according to claim 8, wherein said micrometric valve is configured to operate at a maximum pressure of 400 bars.

11. A servo-positioner according to claim 10, wherein said micrometric valve is configured to control the pressure within plus or minus 0.1 bar.

12. A servo-positioner according to claim 8, wherein said micrometric valve is configured to operate at a maximum temperature of 250° C.

13. A servo-positioner according to claim 8, wherein said servomotor is a step motor.

14. A servo-positioner according to claim 8, wherein said opening made of polyetheretherketone is configured and arranged such that a dead volume for said micrometric valve is less than 0.5 cm$^3$.

* * * * *